US006944335B2

(12) United States Patent
Pettigrew et al.

(10) Patent No.: US 6,944,335 B2
(45) Date of Patent: Sep. 13, 2005

(54) IMAGE DATA PROCESSING WITH COLOR MODIFICATION

(75) Inventors: Daniel Pettigrew, Montreal (CA); Francois Paquin, Montreal (CA)

(73) Assignee: Autodesk Canada Inc., Montreal (CA)

( * ) Notice: Subject to any disclaimer, the term of this patent is extended or adjusted under 35 U.S.C. 154(b) by 684 days.

(21) Appl. No.: 09/780,642

(22) Filed: Feb. 9, 2001

(65) Prior Publication Data

US 2001/0036310 A1 Nov. 1, 2001

(30) Foreign Application Priority Data

Apr. 7, 2000 (GB) .............................. 0008469

(51) Int. Cl.⁷ ................................................. G06K 9/00
(52) U.S. Cl. ..................................... 382/167; 358/520
(58) Field of Search ................................ 382/162–167; 345/583–609; 358/518–530

(56) References Cited

U.S. PATENT DOCUMENTS

| | | | | |
|---|---|---|---|---|
| 4,839,718 A | * | 6/1989 | Hemsky et al. ............. | 348/577 |
| 5,305,994 A | | 4/1994 | Matsui et al. | |
| 5,416,890 A | * | 5/1995 | Beretta ....................... | 345/590 |
| 5,544,284 A | * | 8/1996 | Allebach et al. ............ | 345/603 |
| 6,072,902 A | * | 6/2000 | Myers ........................ | 382/167 |
| 6,317,128 B1 | * | 11/2001 | Harrison et al. ............ | 345/629 |
| 6,429,875 B1 | * | 8/2002 | Pettigrew et al. ........... | 345/591 |
| 6,504,551 B1 | * | 1/2003 | Takashima et al. ......... | 345/649 |

FOREIGN PATENT DOCUMENTS

| | | |
|---|---|---|
| EP | 0392565 | 10/1990 |
| GB | 2045026 A | 10/1980 |
| JP | 080036640 | 2/1996 |
| WO | WO 98/10586 | 3/1998 |

* cited by examiner

*Primary Examiner*—Jingge Wu
(74) *Attorney, Agent, or Firm*—Gates & Cooper LLP

(57) ABSTRACT

A method of modifying image data in which image colors are to be modified, including a first step of initializing a color vector function, in which color vector is a function of luminance, and then the following repeated steps. A user defines a luminance range (616, 617) and a color vector (620) for that range. The color vector function is updated (601) and a look-up table (407) is generated (602) that is addressable by luminance. Image data (405) is processed by calculating each pixel's luminance and using this to address the red, green and blue values in the look-up table (407). The red, green and blue values so obtained are then added to each pixel's original red, green and blue values, resulting in output image pixels.

30 Claims, 15 Drawing Sheets

$Y' = 0.299N\ R + 0.587\ G + 0.114\ B$
$Pb = -0.169\ R - 0.331\ G + 0.5\ B$
$Pr = 0.5\ R - 0.419\ G - 0.081\ B$

1402

MATRIX 'A' TRANSFORMS RGB TO Y'Pb Pr

MATRIX 'A$^{-1}$' TRANSFORMS Y' Pb Pr TO RGB

RGB BLACK = ( 0, 0, 0 ); Y' Pb Pr BLACK = ( 0, 0, 0 )
RGB WHITE = ( 1, 1, 1 ); Y' Pb Pr WHITE = ( 1, 0, 0 )

IMAGE DATA PROCESSING WITH COLOR MODIFICATION

BACKGROUND OF THE INVENTION

1. Field of the Invention

The present invention relates to apparatus for processing image data, a method of processing image data and a computer-readable medium.

2. Description of the Invention

The digitisation of image processing has enabled many new image manipulation techniques to be developed. Available digital processing effects include a process of color warping, in which color attributes of an image, or area of an image, can be modified in some way. Common uses for such a technique are compensation for camera or film color distortions and special effects.

Many image processing systems provide control over color through the use of gamma correction curves. A gamma correction curve define transfer functions that are applied to red, green and blue image data values, in such a way that a color transformation may occur. However, manipulation of such curves to produce satisfactory results is extremely difficult. In the case of creating special effects, the lack of intuitive feel of such an approach makes achieving useful results extremely difficult.

From a mathematical perspective, many systems provide color transformations defined in terms of matrices. Matrices may be used to define arbitrary transformations in color space, just as they are used in the more familiar world of computer modelling and computer-aided design. However, although such techniques theoretically provide an enhanced level of control over color space, and have the potential to facilitate useful color warping tools, the lack of an intuitive relation between the mathematics and the effect upon the colors of an image makes these techniques difficult to use.

BRIEF SUMMARY OF THE INVENTION

According to an aspect of the present invention, there is provided apparatus for processing image data, comprising storing means for storing instructions, memory means for storing said instructions during execution and for storing image data, processing means for performing image processing in which said image data is processed to modify color values, and display means for facilitating user interaction with said image processing, wherein said processing means is configured such that, in response to said instructions, said image data is processed by the steps of: identifying a color vector and a luminance range for said color vector; defining a color vector function in response to said identification, in which said color vector is a function of luminance; processing source image data to identify luminance values; and modifying colors in response to said luminance values with reference to said color vector function.

BEST MODE FOR CARRYING OUT THE INVENTION

The invention will now be described by way of example only with reference to the accompanying drawings.

Figure 1:
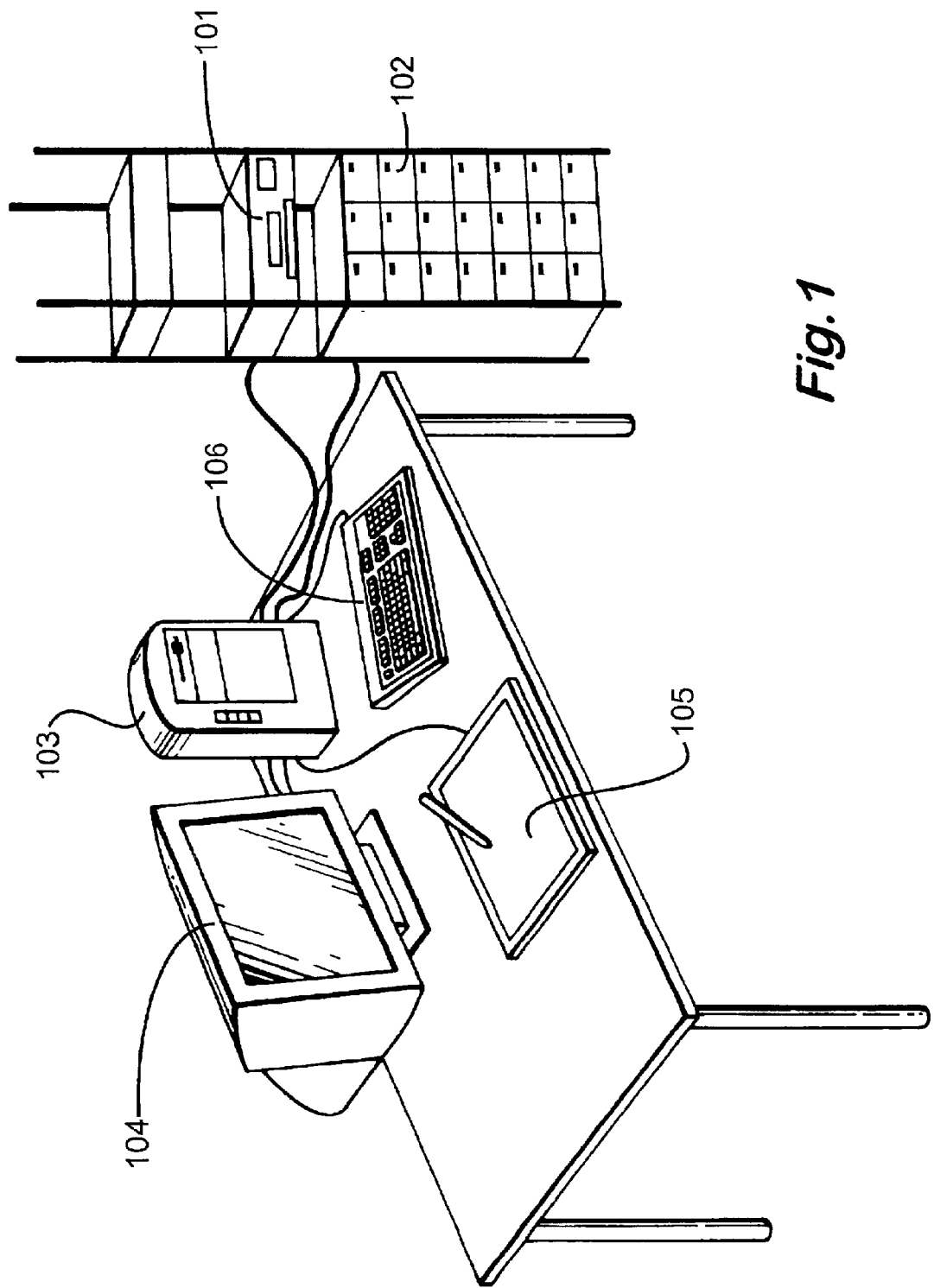
FIG. 1 shows an image processing system including a computer and a monitor.

A system for the processing of image data is illustrated in FIG. 1. A digital tape player 101 plays and records digital tapes having a high data capacity suitable for storing many frames of high definition image data. In preparation for image processing, images for a film clip are transferred from a tape in the tape player 101 to a frame store 102. The frame store 102 comprises several high capacity hard disk drives, arranged to supply and store image data in parallel across many individual drives at once. The hard disk drives are configured as a redundant array of inexpensive disks (RAID). Using the frame store 102, it is possible to play back and record high resolution film images at any location in a clip without having to wait for a tape wind mechanism to reach the required frame. Furthermore the frame store facilitates real time play and record of image data, when the amount of processing being performed is minimal, for example when previewing a stored clip.

A computer 103 facilitates the transfer of image data between the tape player 101 and the frame store 102. The computer 103 also facilitates the modification, processing and adjustment of image data to form an output clip that will eventually be stored onto digital tape. The computer is a Silicon Graphics Octane (™). Images are previewed on a monitor 104 on which is also displayed a graphical user interface (GUI) to provide the user with several controls and interfaces for controlling the manipulation of image data. When processing image data, the user interacts with images and the graphical user interface displayed on the monitor 104 via a graphics tablet 105. For alphanumeric input, there is provided a keyboard 106, although facilities may be provided via the graphical user interface to facilitate occasional text input using the graphics tablet 105.

In addition to receiving image data from the tape player 101 and the frame store 102, the computer 103 may receive image and or other data over a network. The image processing system shown in FIG. 1 facilitates the manipulation of image data by a digital artist in order to achieve high quality special effects and processing of image data.

In a typical application, film clips are digitised and stored on digital tape for transfer to the system shown in FIG. 1. The film clips include several camera shots that are to be combined into the same scene. It is the task of the user or digital artist to combine and process this source image data into a single output clip that will be stored back onto tape for later transfer to film or video. Typical examples of this type of scene are where real images shot by a film camera are to be combined with artificially generated images and backgrounds, including scenes where actors are to be placed in computer-generated environments.

Figure 2:
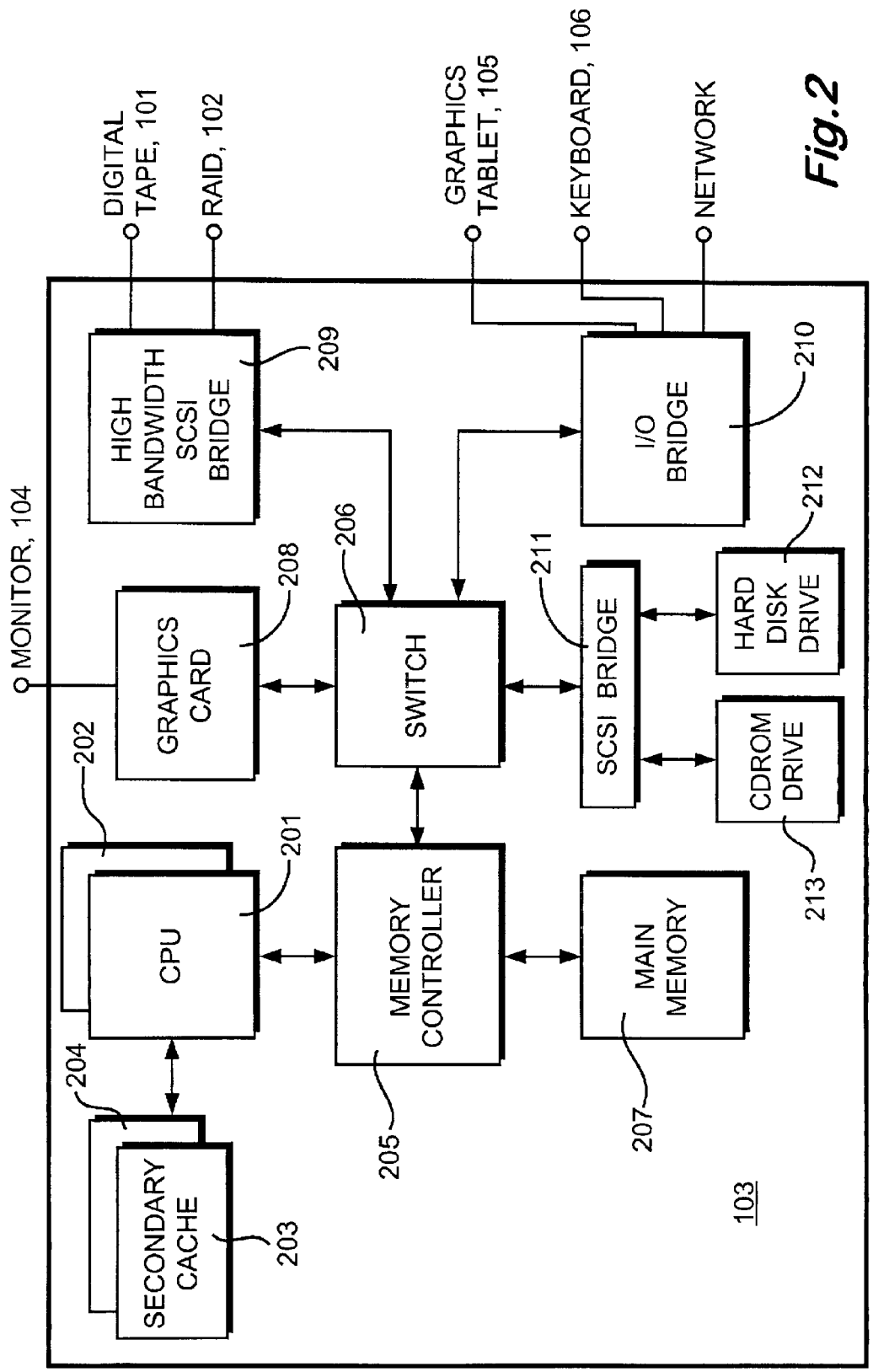
FIG. 2 details components of the computer shown in FIG. 1, including a main memory.

The computer 103 shown in FIG. 1 is detailed in FIG. 2. Two MIPS R12000 central processing units (CPUs) 201 and 202 are configured to process instructions and data in parallel. Primary cache facilities are provided within each of the processors 201 and 202 in the form of a separate instruction and data cache. Both processors 201 and 202 are equipped with a one megabyte secondary cache 203 and 204. The CPUs 201 and 202 are connected via a memory controller to a switch 206 and a main memory 207. The main memory 207 comprises two gigabytes of dynamic RAM.

The switch 206 enables up to seven different non-blocking connections to be made between connected circuits. A graphics card 208 receives instructions from a CPUs 201 or 202 in order to render image data and graphical user interface components on the monitor 104. A high bandwidth SCSI bridge 209 facilitates high bandwidth communications to be made with the digital tape player 101 and the frame store 102. An I/O bridge 210 provides input output interface circuitry for peripherals, including the graphics tablet 105, the keyboard 106 and a network. A second SCSI bridge 211 provides interface connections with an internal hard disk drive 212. This has a capacity of thirteen gigabytes. The second SCSI bridge 211 also provides connections to a CDROM drive 213, from which instructions for the central processing units 201 and 202 may be installed onto the hard disk 212.

Figure 3:
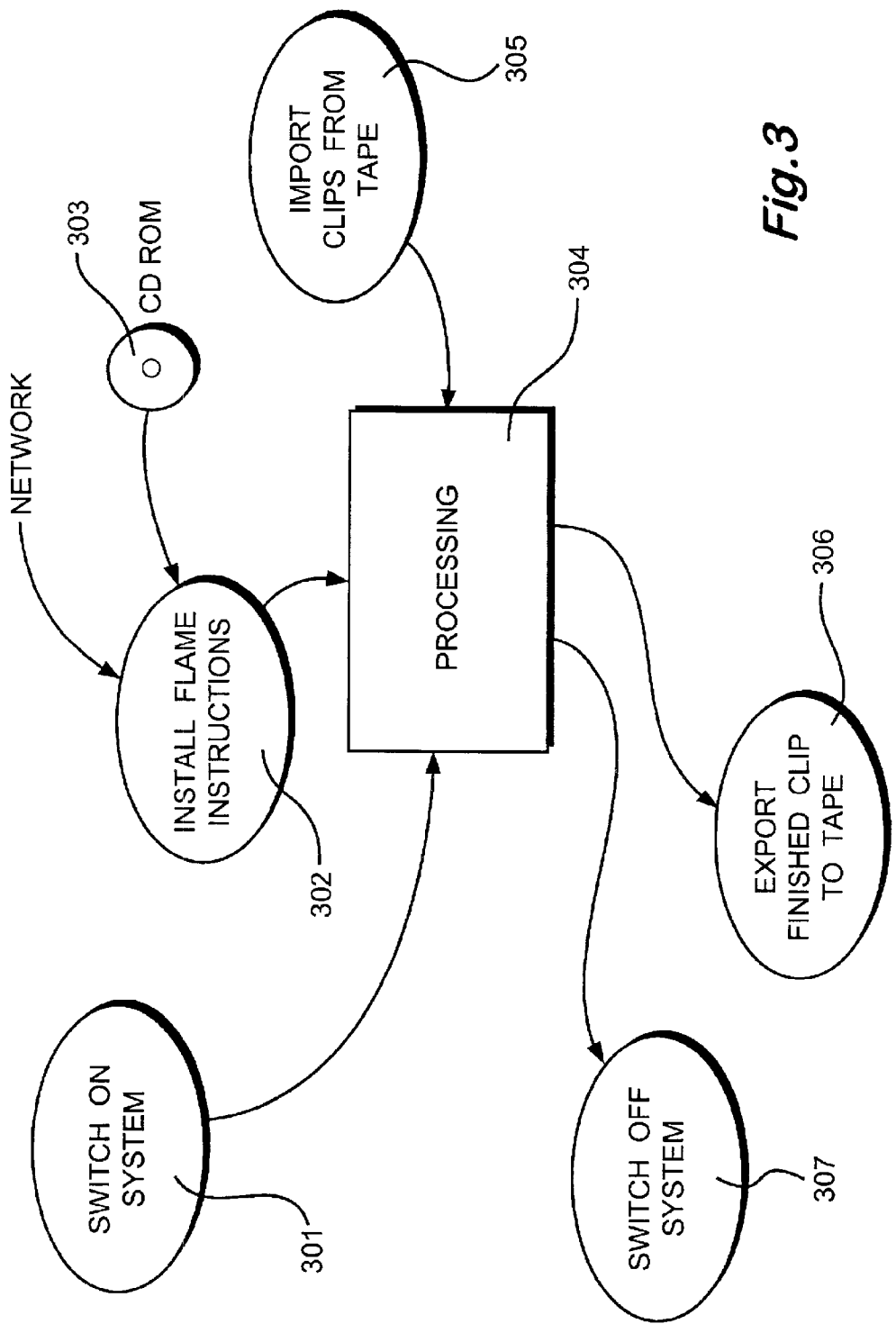
FIG. 3 details user operations performed on the image processing system shown in FIG. 1, including processing images.

Steps performed by the user when operating the image processing system shown in FIG. 1 are detailed in FIG. 3. At step 301 the user switches on the computer 103 and logs on to their user account. If necessary, the user proceeds to step 302 in order to install Flame instructions onto the computer's hard disk 212. Instructions may be provided on a CDROM 303 via the CDROM drive 213, or over a network. Thereafter, control is directed to step 304, whereafter the instructions are executed by the CPUs 201 and 202.

If starting on a new job, it will be necessary to obtain image data from film or video clips stored on digital tapes. This is done at step 305, where input clips are transferred from the tape player 101 to the digital frame store 102. Once a finished clip has been generated from the input clips, this is exported to tape at step 306. Alternative forms of import and export of image data may be performed as necessary, including transfer of image data over a network, transfer of image data from CDROM or transfer of data directly from a camera that may be connected to the input of a suitably equipped graphics card 208. Once finished using the image processing system, at step 307 the user logs off from their account and the computer and other equipment are switched off if necessary.

Figure 4:
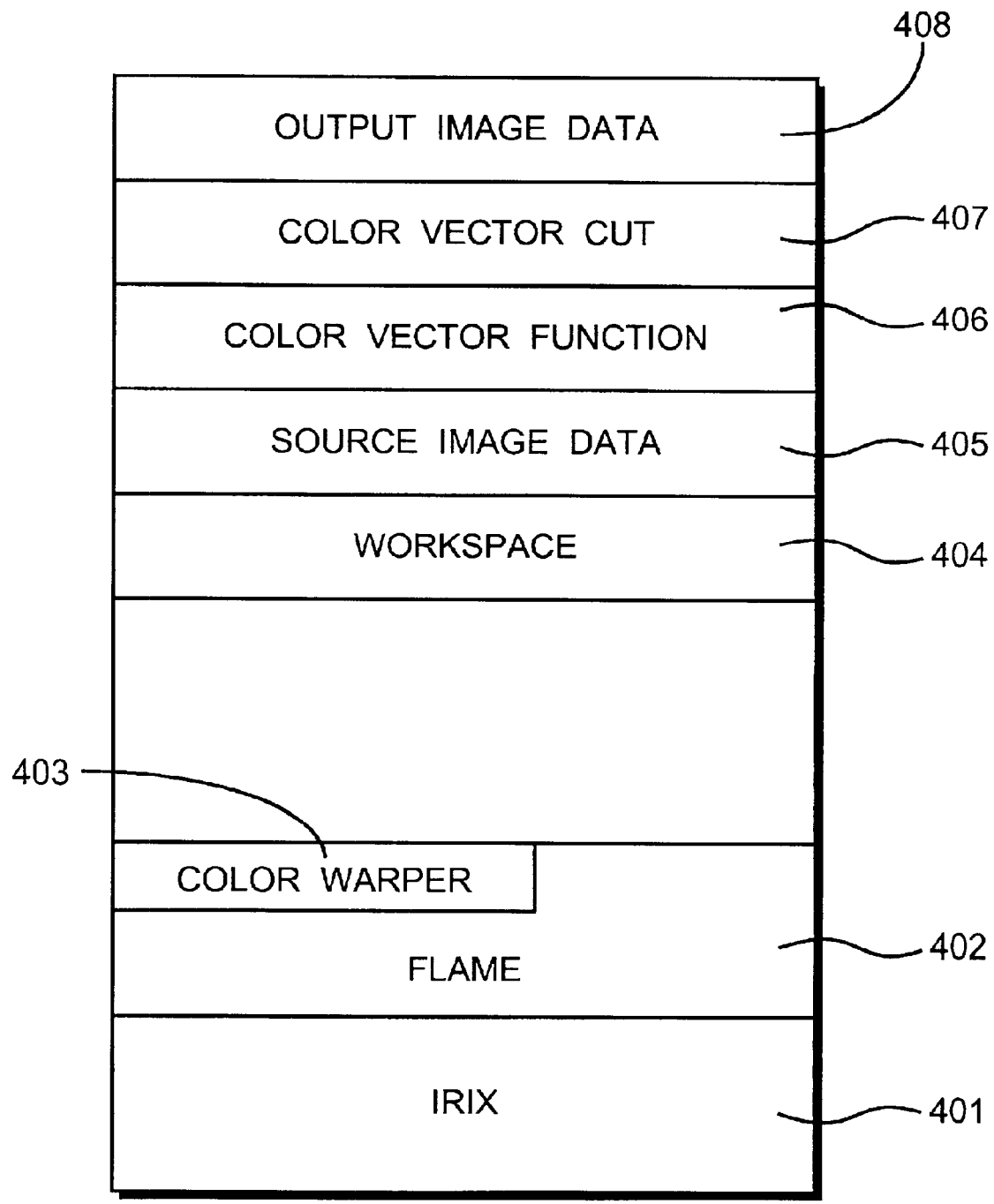
FIG. 4 details the contents of the main memory shown in FIG. 2 as they would appear during the image processing shown in FIG. 3.

The contents of the main memory 207 shown in FIG. 2, during image processing 304, are detailed in FIG. 4. An operating system 401 provides common instructions required for applications running on the computer 103. A suitable operating system is the Irix (™) operating system available from Silicon Graphics.

In the present embodiment, the main memory includes Flame instructions 402 for image processing. The present applicant has image processing applications that include Flame (™), and the word Flame will henceforward refer to an improved version of Flame, operating in accordance with the present invention. Flame instructions 402 include color warper instructions 403. The instructions 402 and 403 may originate from a CDROM 303 or over a network connection, such as an Internet connection.

Main memory 207 further comprises a workspace 404, used for temporary storage of variables and other data during execution of instructions 401, 402 and 403 by the processors 201 and 202. The main memory also includes areas for source image data 405, a color vector function 406, a color vector look-up table (LUT) 407 and output image data 408.

Figure 5:
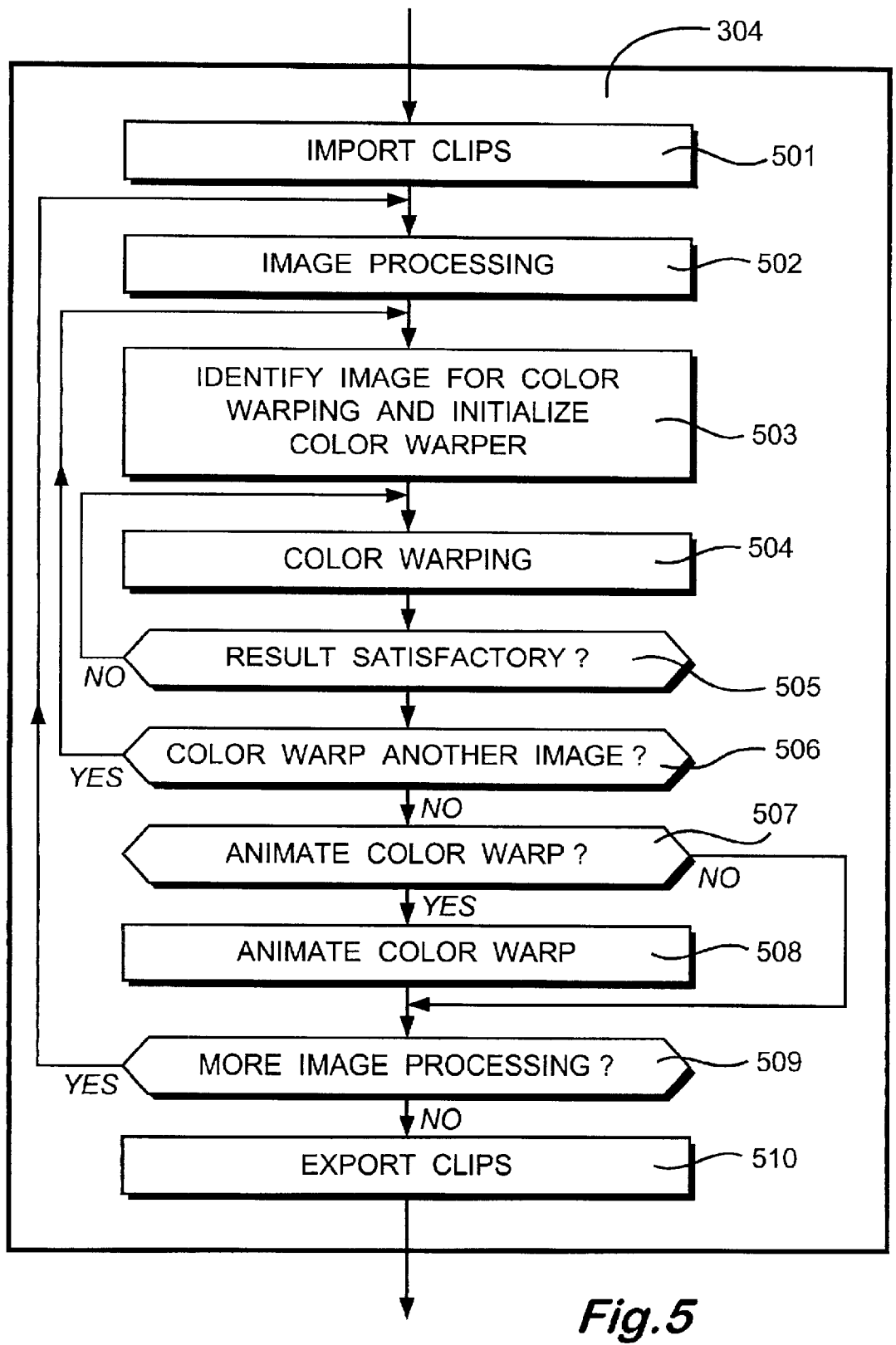
FIG. 5 details processes performed during image processing shown in FIG. 3, including a color warper.

Image processing 304 shown in FIG. 3, facilitated by instructions 402 and 403, is detailed in FIG. 5. At step 501 the user initiates operations to import clips of image data. A clip comprises sequential image frames that may originate from a variety of sources, such as video or film. Each frame may comprise several megabytes of image data, depending upon the source and data format. The import operation results in a transfer of image data from a source medium, such as a digital tape on digital tape player 101, to the frame store 102.

At step 502, image processing other than color warping is performed. Many operations may be performed at step 502, including effects such as color keying, image distortion, motion blur, and so on.

Color warping is a process in which a general shift in color is applied to an image. Known systems provide color warping using gamma curves for red, green and blue color components. While these curves provide comprehensive control of color, the relation between the user's interaction with such curves and the resulting change in color in an output image is non-intuitive.

At step 503 an image is identified for color warping, and the color vector function 406 is initialised so as to have no effect. At step 504 color warping is performed in accordance with the present invention, and in accordance with operations performed by the processors 201 and 202 in response to the color warping instructions 403. At step 505 a question is asked as to whether the color warping result is satisfactory. If not, control is directed to step 504, and the color warp effect is modified. Eventually, after several iterations, the resulting output image will have a satisfactory appearance. Thereafter, control is directed to step 506, where a question is asked as to whether another image requires color warping. If so, control is directed to step 503. Alternatively, definitions of color warping for an image or plurality of images is complete, and control is directed to step 507.

At step 507 a question is asked as to whether the color warping defined at step 504 should be animated. Color warping at different frames may be used to control an interpolated color warp for intermediate frames. This enables a gradually changing color warp to be applied over the duration of a clip. If an animated color warp is required, control is directed to step 508, where intermediate frames in the clip have their images modified automatically, without the need to repeat step 504 for each intermediate frame on an individual basis.

At step 509 a question is asked as to whether more image processing is required, for example, for other clips. If so, control is directed to step 502. Alternatively image processing is complete, and the resulting output clips may be exported to tape or other medium, at step 510.

Figure 6:
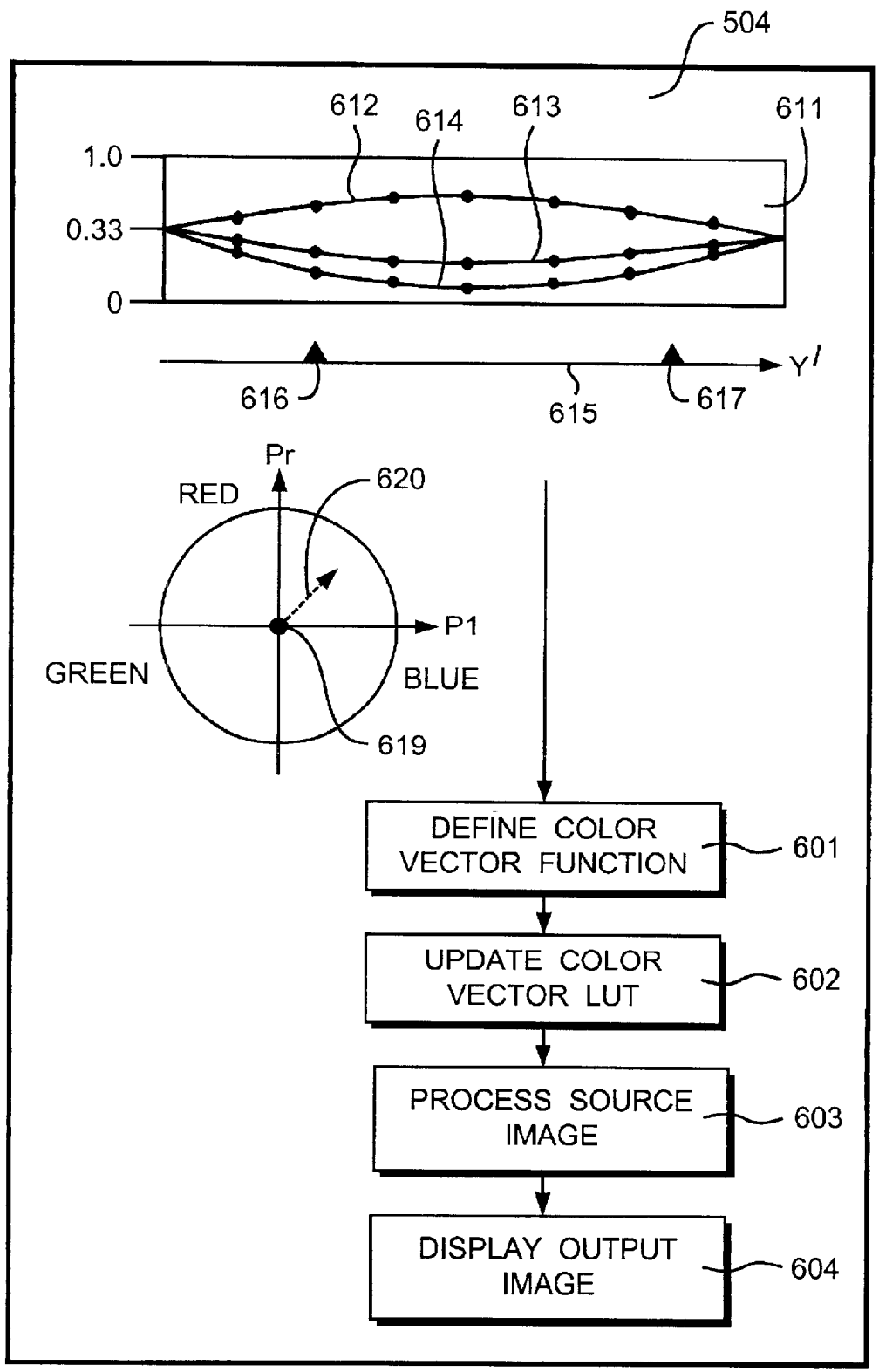
FIG. 6 details the color warper process shown in FIG. 5, and summarises the invention, including a color vector graph and steps of defining a color vector function, updating a color vector LUT and processing a source image.

Color warping 504, as performed in accordance with the present invention, is summarised in FIG. 6. A color vector function is defined at step 601. The color vector function defines color vectors as a continuous function of luminance. In the preferred embodiment, this continuous function is defined by nine discreet data points that can be joined by a bspline curve when intermediate data values are required. The color vector function is represented at the top of FIG. 6 in the form of a color vector graph 611 that is presented to the user during the color warping.

The color vector graph 611 has three components, one each for red 612, green 613 and blue 614. These components can be made to vary in their proportions as a function of luminance 615. For any given luminance Y', the red, green and blue values add up to give a total of one. At either end of the graph 611, the color vector is zero, and the three curves converge to a common value of one third. The vertical axis of the graph is scaled in such a way that one third appears as half the maximum color displacement.

A minimum luminance 616 and a maximum luminance 617 define a range of luminance over which a color vector will be added to the color vector function 406 that is already displayed in the graph 611. The color vector is defined by user manipulation of a graphical user interface widget in the form of a trackball 618. The trackball has color dimensions Pb and Pr of the Y'PbPr color space. The user can drag the center 619 of the trackball in any direction 620. The magnitude of this movement defines the amplitude of the color vector that is being added to the graph. The direction of this movement defines the color. As soon as the drag operation is finished, the trackball 618 reverts to its central state, thereby enabling the user to accumulate many such vector inputs. By also modifying the luminance range using the markers 616 and 617, the user is quickly able to build up a complex color vector function 406.

The color vector function 406 defined at step 601 is defined as a set of nine points for each of red, green and blue curves shown in the graph. At step 602 the color vector function 406 is used to create a color vector look-up table 407 (LUT). The use of a look-up table 407 enables subsequent image processing to take place with minimal computation requirements. At step 603 the source image 405 is processed with reference to the LUT 407 created at step 602, resulting in the generation of an output image 408. Finally, at step 604, the output image is displayed on the monitor 104, so that the user can determine whether or not the result is satisfactory, and what modifications might be required in the next iteration of the color warping steps 601 to 604.

Figure 7:
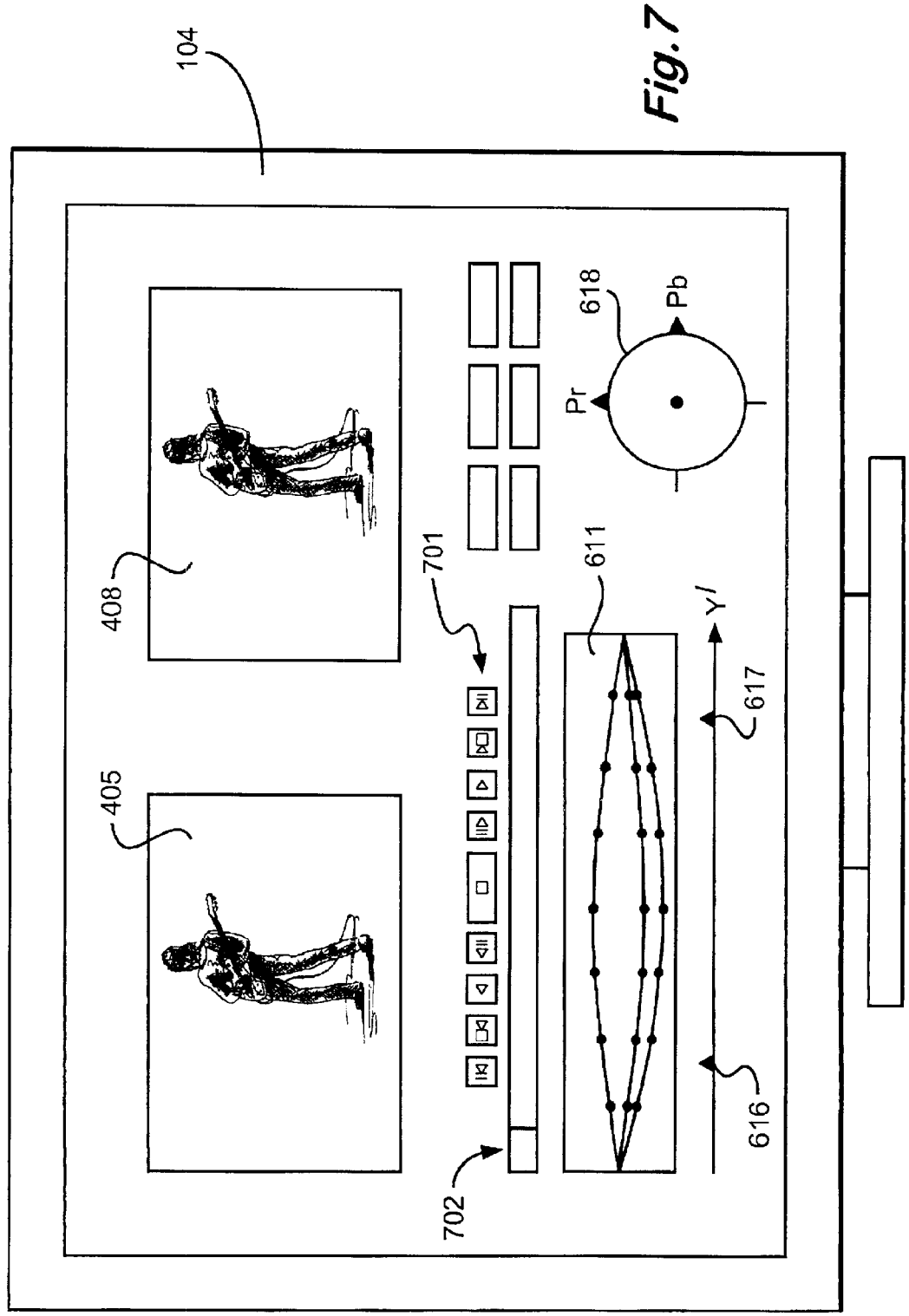
FIG. 7 details the user interface presented to the user on the monitor shown in FIG. 1 during operation of the color warper process shown in FIG. 5.

The interface presented to the user of the monitor 104 when performing color warping 504, is shown in FIG. 7. The source and output images 405 and 408 are displayed in the top half of the screen. Transport controls 701 and a timeline 702 enable a user to select individual frames from a clip, or to preview or render a sequence of frames or an entire clip. Other controls are provided for the control of color warp animation and the saving and loading of settings. The color vector graph 611 and the trackball 618 are at the bottom of the screen. The luminance markers 616 and 617, in combination with the trackball 618, facilitate quick definition of a range of luminance values and a color vector to be added to the existing color vector function over the identified range 616, 617 of luminance values.

Figure 8:
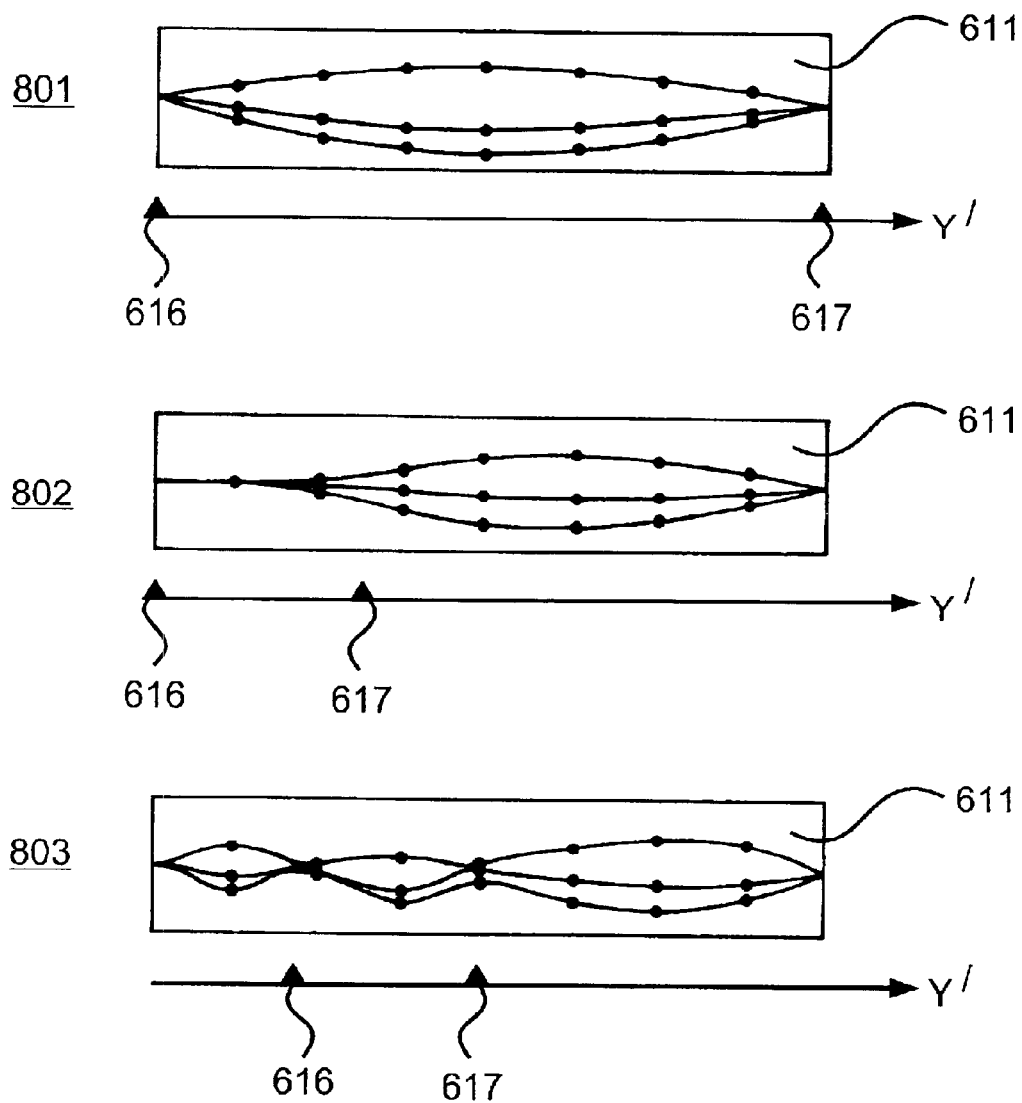
FIG. 8 details examples of the color vector graph shown in FIG. 6.

Examples of the types of color vector functions that can be achieved are shown in their graph form 611 in FIG. 8. With the range markers 616, 617 set to luminance values of zero and one respectively, color vectors defined by user manipulation of the trackball 618 cause a general change to the red, green and blue color curves, as shown at 801. With the maximum marker 617 moved to a luminance of one quarter, changes can then be made to the curves over a selected small range of luminance, with no changes to the curves outside this range, as shown at 802. After multiple iterations of range selection and color vector addition, complex curves can be created, as shown at 803. The level of complexity shown at 803, however, can be built up extremely quickly due to the nature of the interface provided.

Figure 9:
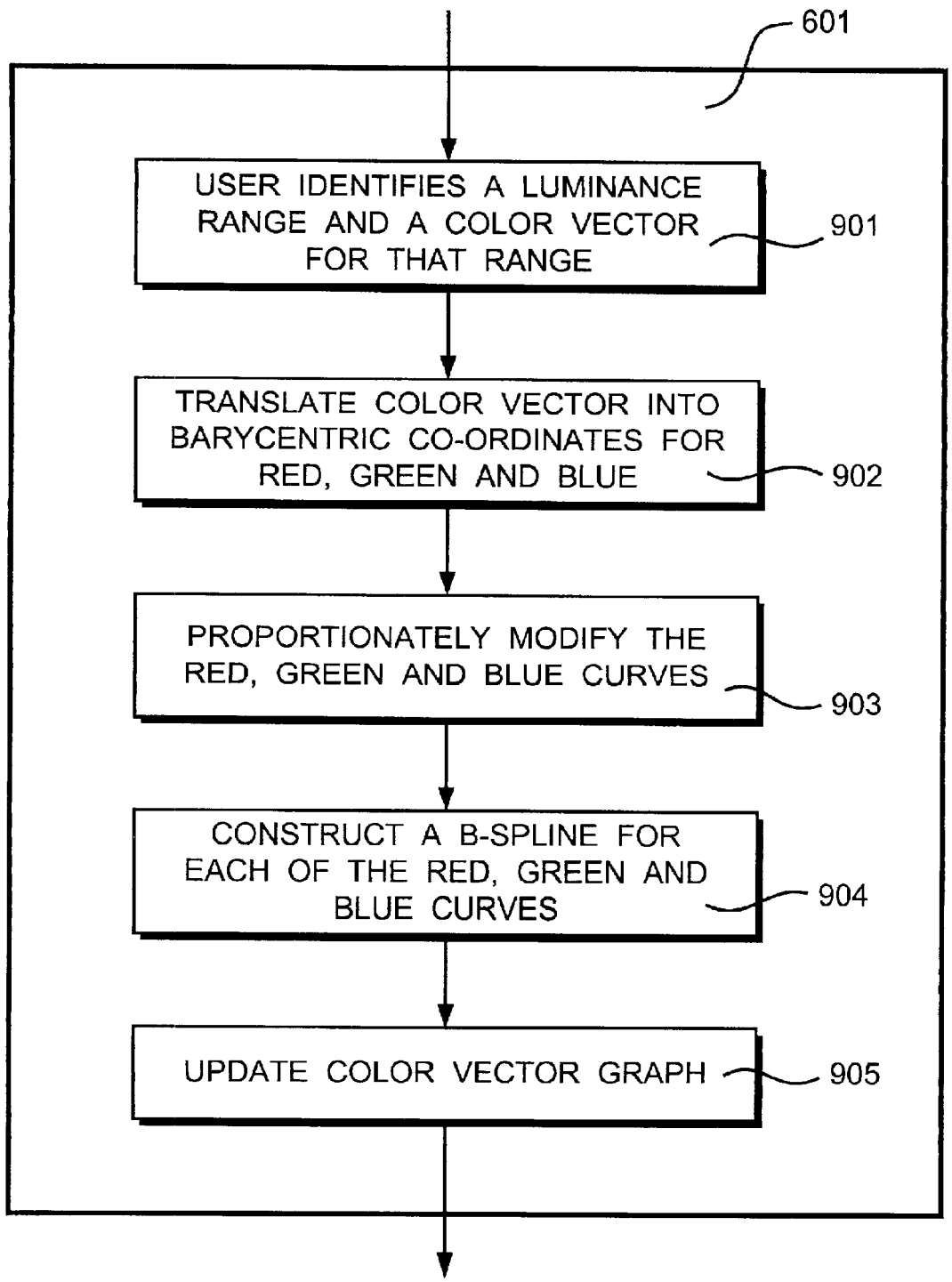
FIG. 9 details the step of defining a color vector function shown in FIG. 6, including steps of translating a color vector and modifying curves.

The step of defining a color vector function, shown at 601 in FIG. 6, is detailed in FIG. 9. At step 901 the user identifies a luminance range and a color vector for that range, using the range markers 616, 617 and the trackball 618. In order to update the color vector function 406 and also the curves of the graph 611, it is necessary to perform processing that combines the user's identified luminance range 616, 617 and color vector 620 with the existing color vector function. These calculations are performed at steps 902, 903 and 904.

At step 902 the color vector, expressed as Pb and Pr co-ordinates, is translated into barycentric co-ordinates for red, green and blue. These barycentric co-ordinates represent the difference to be added to the red, green and blue curves of the existing color vector function. At step 903 these red, green and blue increments are applied proportionately to existing red, green and blue curves over the selected range of luminance values. Function characteristics outside the selected range are not affected by changes made inside the selected range. Furthermore, the color vector defined by the trackball movement has maximum effect in the center of the identified range, and practically no effect at its minimum 616 and maximum 617 points.

The curve data that is modified comprises nine data points for each color. Each point has a value, and the collection of twenty-seven data values defines the color vector function. For subsequent processing, these curves require continuous representation. At step 904, B-Splines are created to represent the newly updated red, green and blue curves. Finally, at step 905, the color vector graph 611 is updated so that the user has an immediate view of the effect of his or her actions on the graph, as well as on the output image. Steps 901 to 905 all take place as soon as the user makes a modification using the trackball 618.

Figure 10:
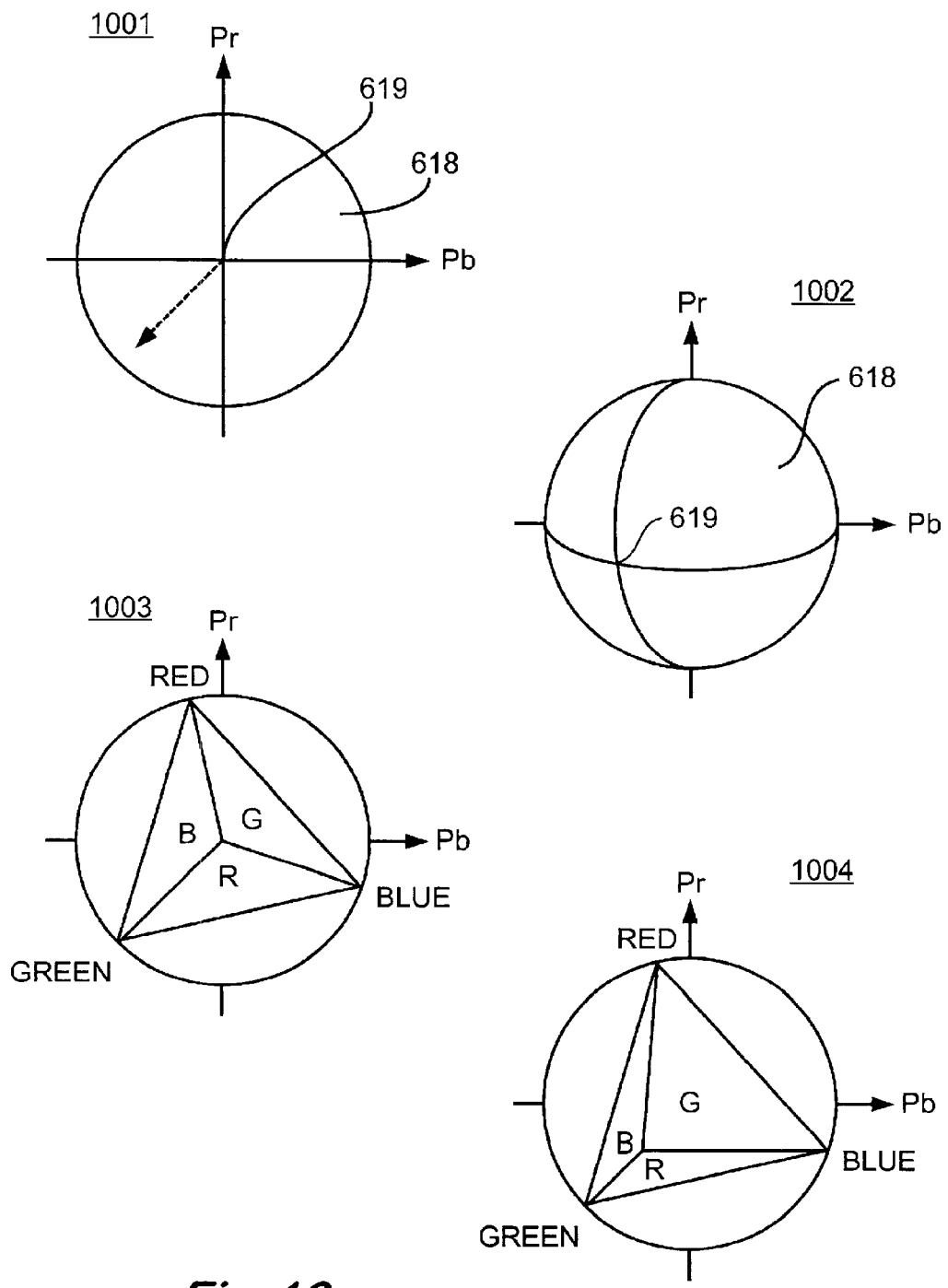
FIGS. 10 and 11 detail calculations involved in the step of translating a color vector shown in FIG. 9.

The translation of a color vector into barycentric co-ordinates, shown at step 902 in FIG. 9, requires calculations illustrated in FIG. 10. At 1001 the trackball 618 is shown in its neutral condition, with its center mark 619 located in the middle of the PbPr color plane. The user drags the trackball towards the lower left, resulting in a displacement of the center 619 as shown at 1002. This displacement has PbPr co-ordinates that require definition in red, green and blue terms.

Locations of red, green and blue are shown in relation to the PbPr color plane at 1003. The red, green and blue points are joined by lines to form a triangle. This triangle is divided into three by lines drawn from red, green and blue points to the center at PbPr=(0,0). In FIG. 10, each triangle is named R, G or B according to its opposite color. If the center is dragged towards green, as shown at 1004, triangle G increases in area. If the initial areas of the triangles are all equal, the change in areas defines the differences that will be applied to red, green and blue curves of the color vector function. Because the area of the red, green, blue triangle is fixed, the R, G and B areas represent varying color proportions whose overall sum does not change, these areas may therefore be considered as being barycentric co-ordinates.

Figure 11:
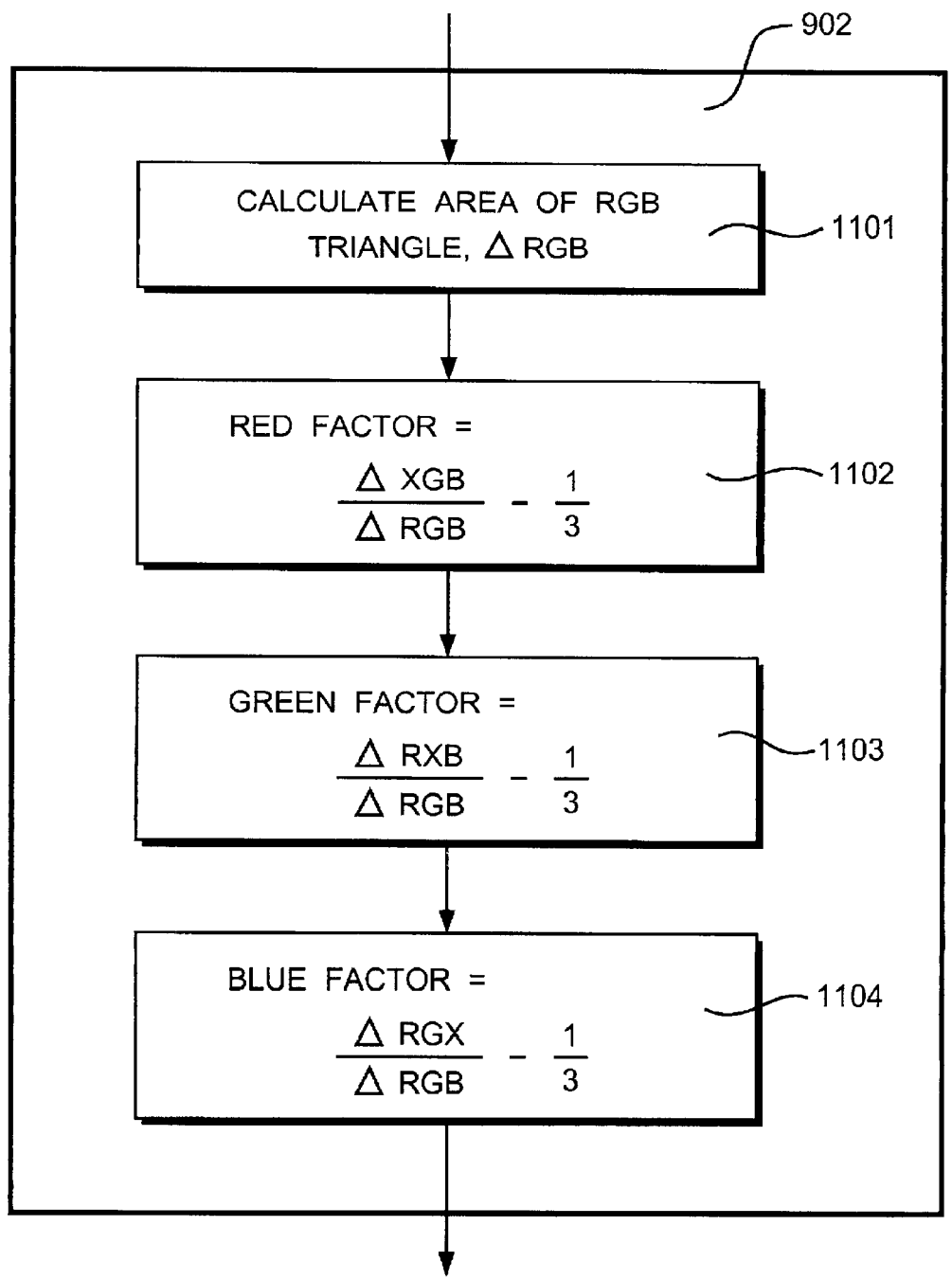

Calculations for obtaining barycentric co-ordinates in accordance with the processes illustrated in FIG. 10, are detailed in FIG. 11. For the purposes of FIG. 11, the equations shown relate to points R, G and B at the red, green and blue points of PbPr color plane, and X is the center of that plane at PbPr=(0,0). At step 1101 the area of triangle RGB is calculated. At step 1102 a variable REDFACTOR is calculated by dividing the area of triangle XGB by the area of triangle RGB calculated at step 1101. A value of one third is then subtracted from the result of this division. A similar process is repeated for the green and blue factors at steps 1103 and 1104.

Figure 12:
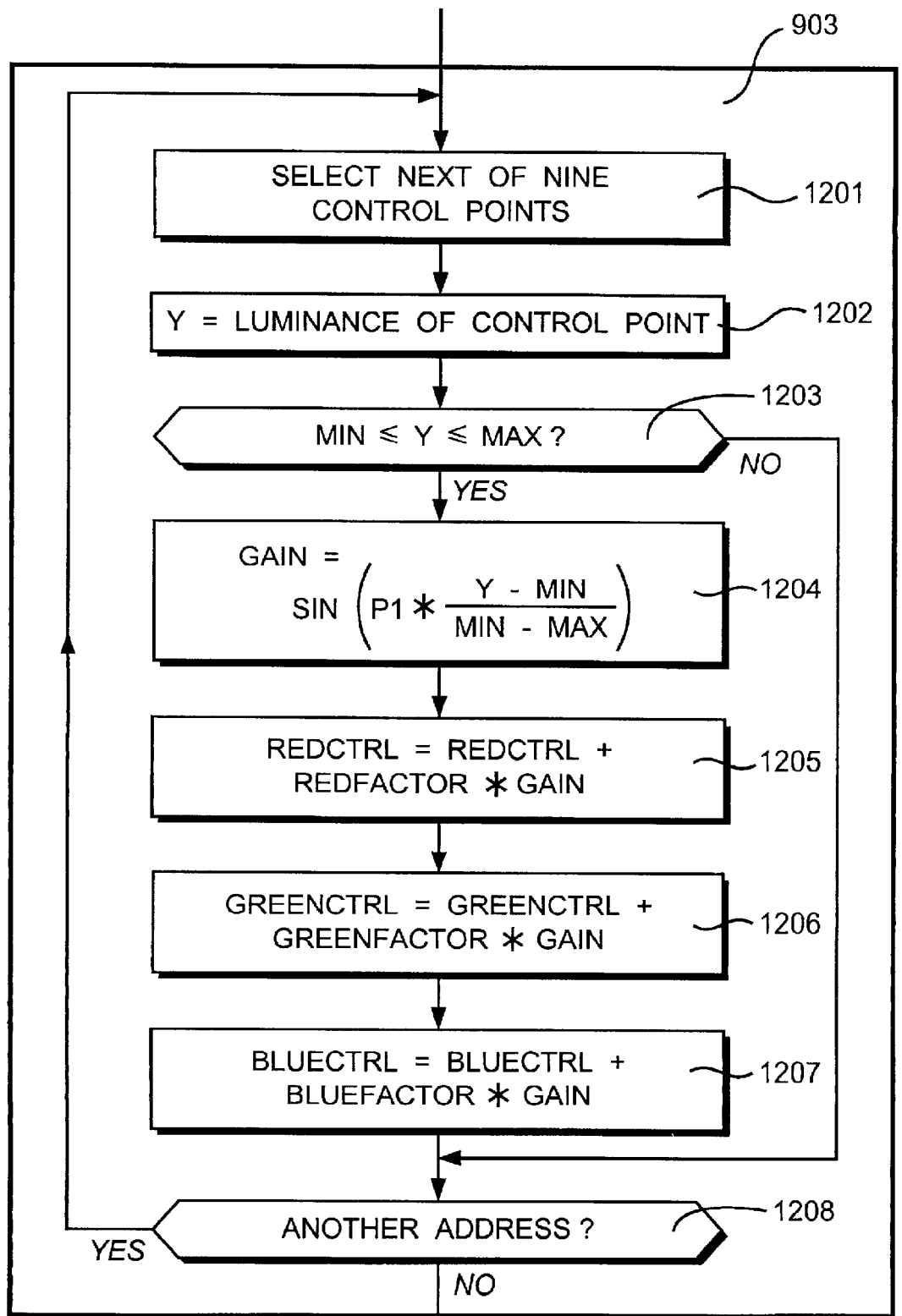
FIG. 12 details the step of modifying curves shown in FIG. 9.

The proportionate modification of red, green and blue curves, shown at step 903 in FIG. 9, is detailed in FIG. 12. Each curve is defined by a data value at each of nine control points. At step 1201 the first or next of the nine control points is selected. At step 1202 a variable Y is given the value of luminance for that control point. The first control point will have a Y value of zero, the last control point will have a Y value of one. At step 1203 a question is asked as to whether Y is in the range defined by the minimum and maximum luminance markers 616 and 617. If not, no adjustments are required for this control point, and control is directed to step 1208. Alternatively, control is directed to step 1204, where a gain value is calculated. This has the effect of defining a gain value of one if the control point is at the very center of the identified luminance range 616, 617, and this varies in a sine curve down to zero at the limits of the identified luminance range 616, 617.

At step 1205 the current value REDCTRL for the red control point is modified by multiplying the REDFACTOR calculated at step 1102 in FIG. 11 by GAIN calculated at step 1204. A similar process is repeated for GREENCTRL and BLUECTRL at steps 1206 and 1207. At step 1208 a question is asked as to whether another of the nine control points requires consideration. If so, control is directed to step 1201. Alternatively, all control points for the red, green and blue curves have been updated.

Figure 13:
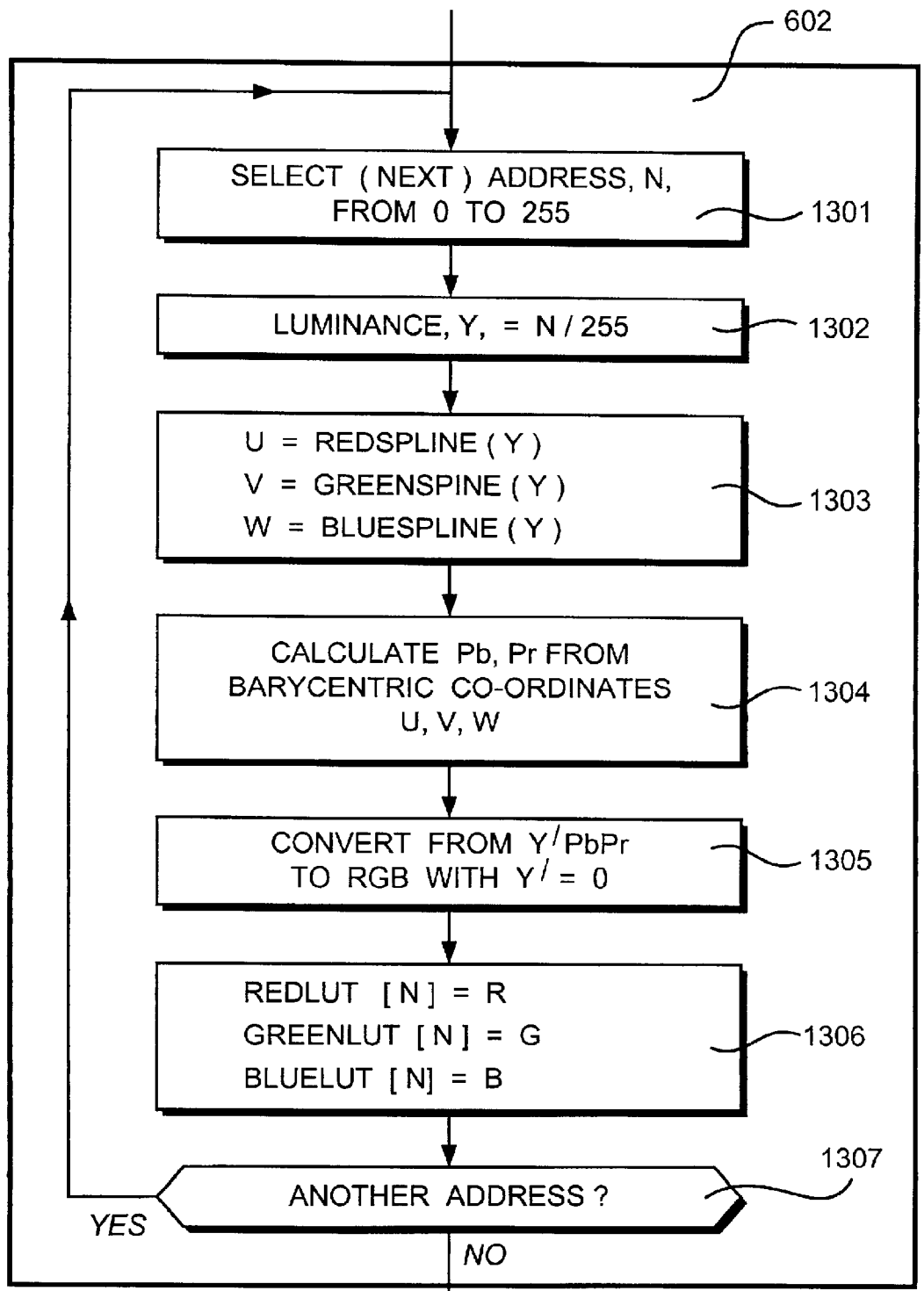
FIG. 13 details the step of updating a color vector LUT shown in FIG. 6.

Updating the color vector LUT 407, performed at step 602 in FIG. 6, is detailed in FIG. 13. The steps shown in FIG. 13 relate to an embodiment in which luminance values are processed as integers in the range zero to 255. In this embodiment, an LUT having 256 entries is used. However, in an alternative embodiment, where 4096 different luminance levels are used to represent luminance from zero to one, a LUT 407 having 4096 entries can be used. At step 1301 the first or next address value, N, from zero to two hundred and fifty-five, is selected. At step 1302 a luminance value Y is calculated, being equal to N/255. At step 1303 each of the red, green and blue B-Splines created at step 904 in FIG. 9 is evaluated to determine a barycentric co-ordinate for luminance Y. This may be considered with reference to the graph 611. Two hundred and fifty-six vertical slices are considered, and at each of these a value for red, green and blue is calculated from the respective B-Spline. These are assigned to variables U, V and W respectively.

At step 1304, Pb and Pr co-ordinates are obtained from the barycentric co-ordinates U, V and W. This may be considered as the inverse of the process described in FIGS. 10 and 11. At step 1305, the luminance Y' of the PbPr color plane is set to zero, and the Y'PbPr co-ordinates are then translated into RGB co-ordinates by means of a transformation matrix that converts between these color spaces. The RGB values that are generated range from negative to positive. If the RGB values are all zero, this corresponds to no change in color. The RGB values may be considered as representing a vector that, if added to an RGB pixel of the appropriate luminance, results in the appropriate level of color warp as defined by the user.

At step 1306 the LUT 407 is updated. The LUT comprises three parts, one table each for red, green and blue values. Each of these tables is addressed by the value N, selected at step 1301, and is written with the value calculated at step 1305 for the respective color. At step 1307 a question is asked as to whether another address needs to be considered. If so, control is directed to step 1301. Alternatively, this completes the LUT update process 602.

Figure 14:
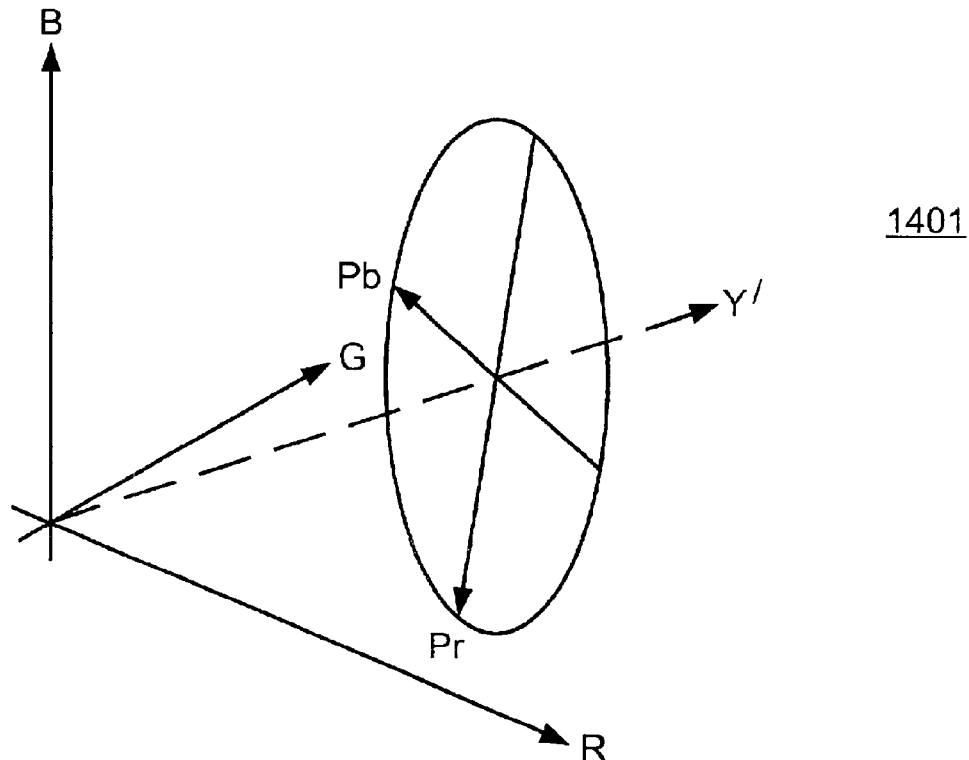
FIG. 14 details color space relationships used by the invention.

FIG. 14 details the relationship between RGB and Y'PbPr color spaces. Pixel data for images 405 and 408 is stored in RGB form, with each pixel being defined by an intensity value for red, green and blue components. In Y'PbPr color space, Y' is a dimension of pure luminance, that may be expressed as a range of fractional values from zero to one. Pb and Pr are pure color dimensions, with Pb being closely related to the blue of RGB, and Pr being closely related to green. Pb and Pr range across negative and positive values, and these may be considered as varying from minus one to plus one. However, these values are arbitrary and depend upon implementation.

Y'PbPr color space may be considered as having a cylindrical shape with a central axis Y', that is a vector extending out from the origin of RGB color space, as shown at 1401. Conversion between these color spaces may be achieved by a matrix, and the parameters required for a transformation from RGB to Y'PbPr are detailed at 1402. Transformation from RGB to Y'PbPr may be assigned to a matrix A. The inverse of A, $A^{-1}$, provides transformation from Y'PbPr to RGB. There is an intuitive relationship between these color spaces for colors of pure black and pure white, as shown at the bottom of FIG. 14. Matrix $A^{-1}$ is used in step 1305 to convert from Y'PbPr color space to RGB color space.

Figure 15:
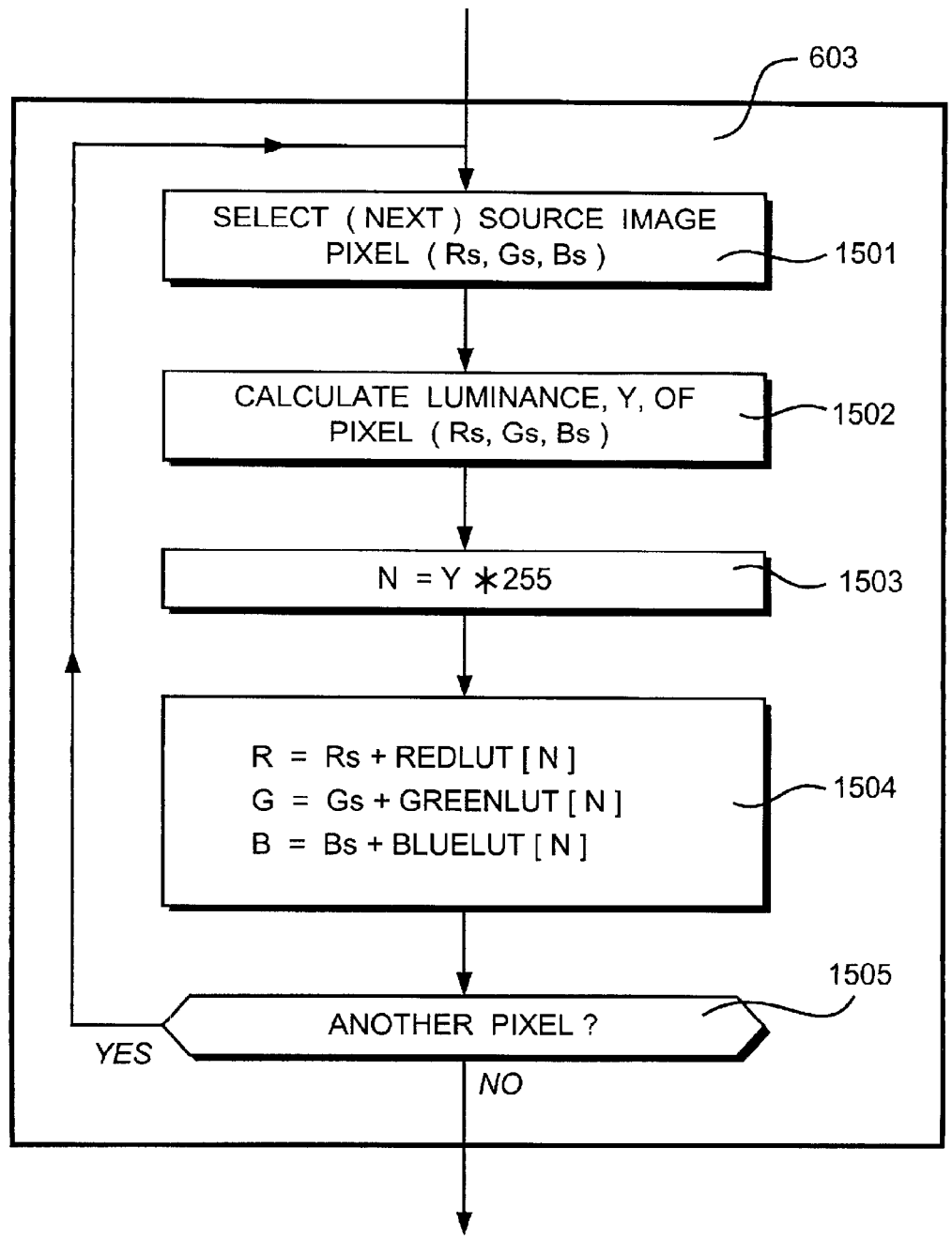
FIG. 15 details the step of processing a source image shown in FIG. 6.

Processing the source image, performed at step 603 and shown in FIG. 6, is detailed in FIG. 15. At step 1501 the first or next source image pixel is selected. This pixel has values (Rs,Gs,Bs). At step 1502 the luminance of this pixel is calculated by applying the equation for Y' shown at 1402 in FIG. 14. At step 1503 an address value N is calculated, and at step 1504 this address value is used to access a data value in each of the red, green and blue tables of the LUT 407. These values are added to Rs, Gs and Bs to obtain the RGB data for the output image pixel. At step 1505 a question is asked as to whether another pixel requires processing. If so, control is directed to step 1501. Alternatively, all source image pixels have been processed, and the result is a new output image 408.

What is claimed is:

1. Apparatus for processing image data comprising:
    storage means for storing instructions;
    memory means for storing said instructions during execution and for storing image data;
    processing means for performing image processing in which said image data is processed to modify colour values; and
    display means for facilitating user interaction with said image processing, wherein
    said processing means is configured wherein, in response to said instructions, said image data is processed by the steps of:

identifying through input a user, a colour vector and a luminance range for said colour vector, wherein said luminance range is identified by the user independently from the identifying of the colour vector;

defining a colour vector function in response to said identifying; and modifying colours in response to said luminance range with reference to said colour vector function.

2. Apparatus according to claim 1, wherein said colour vector function is defined by points on curves.

3. Apparatus according to claim 1, wherein said colour vector function is animated.

4. Apparatus according to claim 1, wherein said colour vector function is defined by applying said identified colour vector to a previously defined colour vector function.

5. Apparatus according to claim 1, wherein said colour vector function is expressed as a look up table addressable by luminance values of image colour data.

6. Apparatus according to claim 1, wherein said colour vector function defines red, green and blue displacements with reference to barycentric co-ordinates.

7. Apparatus according to claim 1, wherein a user performs operations to control said image processing with reference to a graphical user interface presented on a monitor, said interface including a plurality of widgets for facilitating user communication with said processes for modifying colour values.

8. Apparatus according to claim 7, wherein said identification of a colour vector is performed with reference to a user input of co-ordinates from a two-dimensional trackball widget, in which the dimensions controllable from said trackball are dimensions of pure colour.

9. Apparatus according to claim 7, wherein said colour vector is displayed as a graph having three lines, one for each of red, green and blue colour components, said graph having a first axis indicative of colour vector and a second axis of luminance.

10. Apparatus for processing image data comprising:

storage means storing instructions;

memory means for storing said instructions during execution and image data;

processing means for performing image processing in which said image data may processed to modify colour values; and monitor means for facilitating user interaction with said image processing, wherein;

said processing means is configured such that, in response to said instructions, said image data is processed by a first step of:

initialising a colour vector function, in which colour vector is a function of luminance;

and then repeated steps of:

identifying through input a user, a colour vector and a luminance range for said colour vector, wherein said luminance range is identified by the user independently from the identifying of the colour vector;

updating said colour vector function with said identification;

processing source image data to identify luminance values;

modifying source image colour in response to said identified source luminance values with reference to said colour vector function; and previewing said modified source image.

11. A method of processing image data in an image processing system, wherein the image processing system comprises memory means for storing instructions and image data, processing means for performing image processing in which said image data is processed to modify colour values, said instructions defining colour modifying operations to be performed by said processing means to process said image data, wherein said operations comprise:

identifying through input a user, a colour vector and a luminance range for said colour vector, wherein said luminance range is identified by the user independently from the identifying of the colour vector;

defining a colour vector function in response to said identification, in which colour vector is a function of luminance;

processing source image data to identify luminance values; and modifying colours in response to said luminance values with reference to said colour vector function.

12. A method according to claim 11, wherein said colour vector function is defined by points on curves.

13. A method according to claim 11, wherein said colour vector function is animated.

14. A method according to claim 11, wherein said colour vector function is defined by applying said identified colour vector to a previously defined colour vector function.

15. A method according to claim 11, wherein said colour vector function is expressed as a look up table addressable by luminance values of image colour data.

16. A method according to claim 11, wherein said colour vector function defines red, green and blue displacements with reference to barycentric co-ordinates.

17. A method according to claim 11, wherein a user performs operations to control said image processing with reference to a graphical user interface presented on a monitor, said interface including a plurality of widgets for facilitating user communication with said processes for modifying colour values.

18. A method according to claim 17, wherein said identification of a colour vector is performed with reference to a user input of co-ordinates from a two-dimensional trackball widget, in which the dimensions controllable from said trackball are dimensions of pure colour.

19. A method according to claim 17, wherein said colour vector is displayed as a graph having three lines, one for each of red, green and blue colour components, said graph having a first axis indicative of colour vector and a second axis of luminance.

20. A method of processing image data in an image processing system, wherein the image processing system comprises memory means for storing instructions and image data, processing means for performing image processing in which said image data is processed to modify colour values, said instructions defining colour modifying operations to be performed by said processing means to process said image data, wherein said operations include a first step of:

initialising a colour vector function, in which colour vector is a function of luminance;

and then repeated steps of:

identifying through input from a user, a colour vector and a luminance range for said colour vector, wherein said luminance range is identified by the user independently from the identifying of the colour vector;

updating said colour vector function with said identification;

processing source image data to identify luminance values;

modifying source image colour in response to said identified source luminance values with reference to said colour vector function; and previewing said modified source image.

21. A computer-readable medium having computer-readable instructions executable by a computer configurable for image processing, said computer including memory means for storing said instructions and image data, processing means for performing image processing in which said image data is processed to modify colour values, said instructions defining operations to be performed by said processing means to process said image data, wherein said operations comprise:

identifying through input a user, a colour vector and a luminance range for said colour vector, wherein said luminance range is identified by the user independently from the identifying of the colour vector;

defining a colour vector function in response to said identification, in which colour vector is a function of luminance;

processing source image data to identify luminance values; and modifying colours in response to said luminance values with reference to said colour vector function.

22. A computer-readable medium according to claim 21, wherein said colour vector function is defined by points on curves.

23. A computer-readable medium according to claim 21, wherein said colour vector function is animated.

24. A computer-readable medium according to claim 21, wherein said colour vector function is defined by applying said identified colour vector to a previously defined colour vector function.

25. A computer-readable medium according to claim 21, wherein said colour vector function is expressed as a look up table addressable by luminance values of image colour data.

26. A computer-readable medium according to claim 21, wherein said colour vector function defines red, green and blue displacements with reference to barycentric co-ordinates.

27. A computer-readable medium according to claim 21, wherein a user performs operations to control said image processing with reference to a graphical user interface presented on a monitor, said interface including a plurality of widgets for facilitating user communication with said processes for modifying colour values.

28. A computer-readable medium according to claim 27, wherein said identification of a colour vector is performed with reference to a user input of co-ordinates from a two-dimensional trackball widget, in which the dimensions controllable from said trackball are dimensions of pure colour.

29. A computer-readable medium according to claim 27, wherein said colour vector is displayed as a graph having three lines, one for each of red, green and blue colour components, said graph having a first axis indicative of colour vector and a second axis of luminance.

30. A computer-readable medium having computer-readable instructions executable by a computer configurable for image processing, said computer including memory means for storing said instructions and image data, processing means for performing image processing in which said image data is processed to modify colour values, said instructions defining operations to be performed by said processing means to process said image data, wherein said operations include a first step of:

initialising a colour vector function, in which colour vector is a function of luminance;

and then repeated steps of:

identifying through input a user, a colour vector and a luminance range for said colour vector, wherein said luminance range is identified by the user independently from the identifying of the colour vector;

updating said colour vector function with said identification;

processing source image data to identify luminance values;

modifying source image colour in response to said identified source luminance values with reference to said colour vector function; and previewing said modified source image.

* * * * *

UNITED STATES PATENT AND TRADEMARK OFFICE
CERTIFICATE OF CORRECTION

PATENT NO.       : 6,944,335 B2
APPLICATION NO.  : 09/780642
DATED            : September 13, 2005
INVENTOR(S)      : Pettigrew et al.

It is certified that error appears in the above-identified patent and that said Letters Patent is hereby corrected as shown below:

On Title Page Item (73) Col. 1-Assignee: "Autodesk Canada Inc." should read --Autodesk Canada Co.--.

Col. 9, line 1: after "identifying", insert a comma.

Col. 9, line 1: "through input a user" should read --through input from a user--.

Col. 9, line 47: "such that" should read --wherein--.

Col. 9, line 53: after "identifying", insert a comma

Col. 9, line 53: "through input a user" should read --through input from a user--.

Col. 10, line 7: after "identifying", insert a comma.

Col. 10, line 7: "through input a user" should read --through input from a user--.

Col. 10, line 8: "wherein said" should read --wherein the--.

Col. 10, line 31: "wherein a user" should read --wherein the user--.

Col. 10, line 59: after "identifying", insert a comma.

Col. 10, line 60: "wherein said" should read --wherein the--.

Col. 11, line 14: After "identifying", insert a comma.

Col. 11, line 14: "through input a user" should read --through input from a user--.

Col. 11, line 15: "wherein said" should read --wherein the--.

Col. 11, line 17: "including" should read --comprising--.

UNITED STATES PATENT AND TRADEMARK OFFICE
CERTIFICATE OF CORRECTION

PATENT NO. : 6,944,335 B2
APPLICATION NO. : 09/780642
DATED : September 13, 2005
INVENTOR(S) : Pettigrew et al.

It is certified that error appears in the above-identified patent and that said Letters Patent is hereby corrected as shown below:

Col. 12, line 27: after "identifying", insert a comma.

Col. 12, line 27: "through input a user" should read --through input from a user--.

Signed and Sealed this

Eighth Day of August, 2006

JON W. DUDAS
*Director of the United States Patent and Trademark Office*